(12) United States Patent
Spriegel

(10) Patent No.: US 6,347,729 B1
(45) Date of Patent: *Feb. 19, 2002

(54) HOSE COUPLING APPARATUS FOR SPRAYER UNIT

(75) Inventor: Clark F. Spriegel, Attica, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/672,247

(22) Filed: Sep. 28, 2000

(51) Int. Cl.$^7$ ................................................. B67D 5/06
(52) U.S. Cl. ...................... 222/529; 222/409; 285/247; 285/330
(58) Field of Search ................................ 222/529, 527, 222/409; 285/245, 246, 247, 330

(56) References Cited

U.S. PATENT DOCUMENTS

| | | |
|---|---|---|
| 1,160,944 A | 11/1915 | Muller |
| 4,042,262 A | 8/1977 | Mooney et al. |
| 5,066,051 A | 11/1991 | Weigl et al. |
| 5,163,721 A | 11/1992 | Babuder |
| 5,299,843 A | 4/1994 | Weigl et al. |
| 5,306,052 A | 4/1994 | MeGushion |
| 5,307,995 A * | 5/1994 | Jackson et al. ............. 239/373 |
| 5,605,359 A | 2/1997 | Hoff |
| 6,059,143 A * | 5/2000 | Weir ............................ 222/61 |
| 6,209,804 B1 * | 4/2001 | Spriegel ..................... 239/373 |

* cited by examiner

*Primary Examiner*—Joseph A. Kaufman
*Assistant Examiner*—Patrick Buechner
(74) *Attorney, Agent, or Firm*—Jaeckle Fleischmann & Mugel, LLP

(57) ABSTRACT

A hose coupling apparatus for removably coupling a hose to a discharge opening of a spray unit includes an elongate hose retainer having a plug end and a stem end. The hose retainer defines a longitudinal fluid passageway extending therethrough from the plug end to the stem end. The plug end is configured for being received within the discharge opening of the spray unit. The stem end is configured for being coupled to the hose. At least one locking tab is disposed intermediate the plug end and the stem end. Each of the at least one locking tab is configured for being disposed within a corresponding slot defined by a neck which surrounds the discharge opening of the spray unit, thereby precluding rotation of the hose retainer relative to the neck. A hose nut defines a hose bore therethrough. The hose bore is configured for receiving the hose such that the hose nut is slidable over the hose. The hose nut is configured for coupling the hose retainer to the neck and for retaining each of the at least one locking tab in disposition within each of the at least one slot.

25 Claims, 3 Drawing Sheets

HOSE COUPLING APPARATUS FOR SPRAYER UNIT

FIELD OF THE INVENTION

The present invention relates generally to sprayer units for dispensing fluid, and, more particularly, to hose coupling apparatuses for use with sprayer units.

DESCRIPTION OF THE RELATED ART

Sprayer units are used for a wide variety of tasks including the spray application of fluids, such as, for example, pesticides, herbicides, plant fertilizers, and cleaning agents. Conventional sprayer units include a reservoir dimensioned to hold a predetermined volume of fluid. The reservoir defines a fill opening through which the reservoir receives and is filled with fluid to be sprayed. A manual pump assembly is threadingly coupled to the fill opening of the reservoir, and is operable to increase pressule within the reservoir to thereby facilitate expulsion of the liquid therefrom. The reservoir also defines a discharge opening which is typically externally threaded. A hose coupling apparatus couples one end of a hose to the discharge opening. A second end of the hose is terminated by a spray nozzle. Fluid flows from the reservoir, through the discharge opening, into the hose, and out the spray nozzle.

The hose coupling apparatus may include a hose retainer and a hose nut. The hose retainer defines a fluid passageway therethrough. One end of the hose retainer and one end of the hose are coupled together. The other end of the hose retainer is received within the discharge opening. Thus, the fluid passageway fluidly connects the hose to the reservoir and the fluid contained therein. The hose nut surrounds the hose proximate the hose insert, and is threaded onto or otherwise secured to the discharge opening. As the hose nut is tightened onto the discharge opening, it engages the hose retainer, thereby securing the hose retainer to the discharge opening.

In use, an operator of the compressed air sprayer unit directs the spraying fluid to a desired target or location by aiming the spray nozzle towards the desired target or location. The spray nozzle is typically twisted or turned to redirect spraying liquid from one target to the next target, or is twisted from side to side to disperse the spraying fluid within a desired area. The turning and/or twisting of the spray nozzle results in a torsional force being imparted to the hose to which the spray nozzle is coupled. A portion of the torsional force may be absorbed by twisting of the hose itself. However, any portion of the torsional force which is not absorbed by twisting of the hose is transferred to the hose coupling apparatus. More particularly, the torsional force is transferred from the hose to the hose retainer and, in turn, to the hose nut. Thus, the hose retainer may rotate relative to the discharge opening. Rotation of the hose retainer, which is in physical engagement with the hose nut, may cause the hose nut to rotate relative to the discharge opening.

If the torsional force upon the hose retainer is in a counter-clockwise direction, a counter-clockwise rotation of the hose retainer may result which, in turn, causes counter-clockwise rotation of the hose nut and thereby reduce the number threads that are interlocked between the hose nut and the discharge opening. Thus, the hose nut may become loose or completely disengage from the reservoir. Such a condition may result in an undesirable or even harmful amount of fluid, such as, for example, pesticides or cleaning agents, being discharged from the sprayer unit. If the torsional force upon the hose retainer is in a clockwise direction, the hose nut may become excessively tightened down upon the discharge opening thereby rendering it difficult to remove the coupling apparatus and the hose from the reservoir. Such a condition renders maintenance and/or repair of the sprayer unit more difficult and time consuming, and may result in premature wear upon and/or damage to the coupling apparatus, hose or reservoir.

Therefore, what is needed in the art is a hose coupling apparatus which substantially eliminates rotation of the hose retainer relative to the discharge opening due to torsional force applied to the hose.

Furthermore, what is needed in the art is a hose coupling apparatus which substantially eliminates rotation of the hose nut relative to the discharge opening due to torsional force applied to the hose.

Moreover, what is needed in the art is a sprayer unit having a coupling apparatus which substantially eliminates loosening of the coupling apparatus due to torsional force applied to the hose.

SUMMARY OF THE INVENTION

The present invention provides a hose coupling apparatus configured for removably coupling a hose to a discharge opening of a spray unit, the discharge opening being surrounded by an elongate neck.

The invention comprises, in one form thereof, an elongate hose retainer having a plug end and a stem end. The hose retainer defines a longitudinal fluid passageway extending therethrough from the plug end to the stem end. The plug end is configured for being received within the discharge opening of the spray unit. The stem end is configured for being coupled to the hose. At least one locking tab is disposed intermediate the plug end and the stem end. Each of the at least one locking tab is configured for being disposed within a corresponding slot defined by the neck which surrounds the discharge opening. A hose nut defines a hose bore therethrough. The hose bore is configured for receiving the hose such that the hose nut is slidable over the hose. The hose nut is configured for coupling the hose retainer to the neck and for retaining each of the at least one locking tab in disposition within a corresponding one of the at least one slot.

An advantage of the present invention is that the hose retainer is precluded from rotating relative to the discharge opening due to torsional force applied to the hose.

Another advantage of the present invention is that the hose nut is precluded from rotating relative to the neck due to torsional force applied to the hose.

Yet another advantage of the present invention is that the hose nut does not rotate and become loose or overly tight due to torsional force applied to the hose, thereby avoiding leakage of fluid from the sprayer unit and/or difficulty in removing the hose coupling apparatus.

BRIEF DESCRIPTION OF THE DRAWINGS

The above-mentioned and other features and advantages of this invention, and the manner of attaining them, will become apparent and be more completely understood by reference to the following description of one embodiment of the invention when read in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE DRAWINGS

Figure 1:
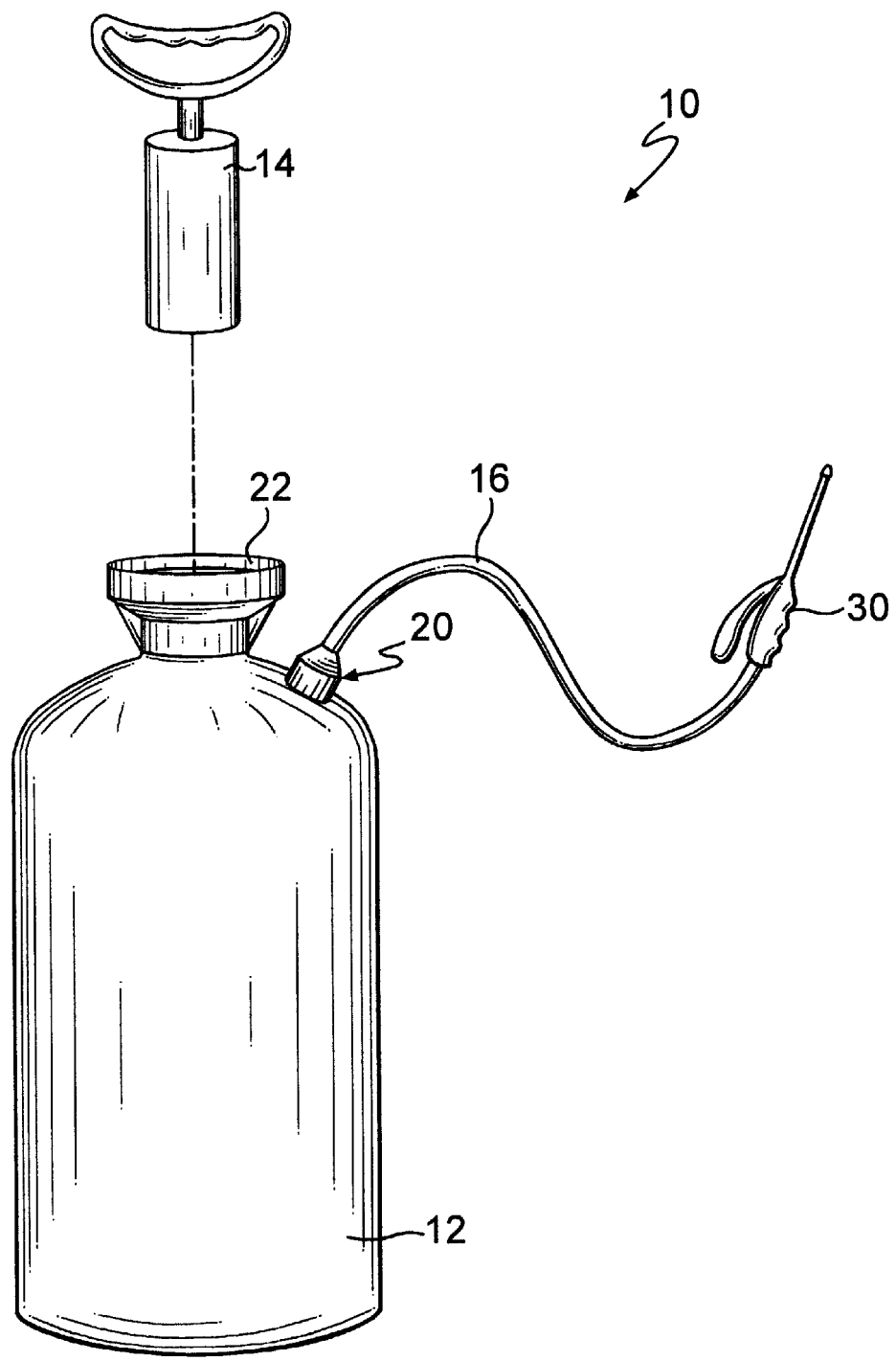
FIG. 1 is a perspective, partially exploded view of a compressed air sprayer unit incorporating one embodiment of a hose coupling apparatus of the present invention.

Referring now to the drawings, and particularly to FIG. 1, there is shown a spray unit having one embodiment of a hose coupling apparatus of the present invention. Spray unit 10 includes reservoir 12, pump 14, hose 16 and coupling apparatus 20.

Figure 2:
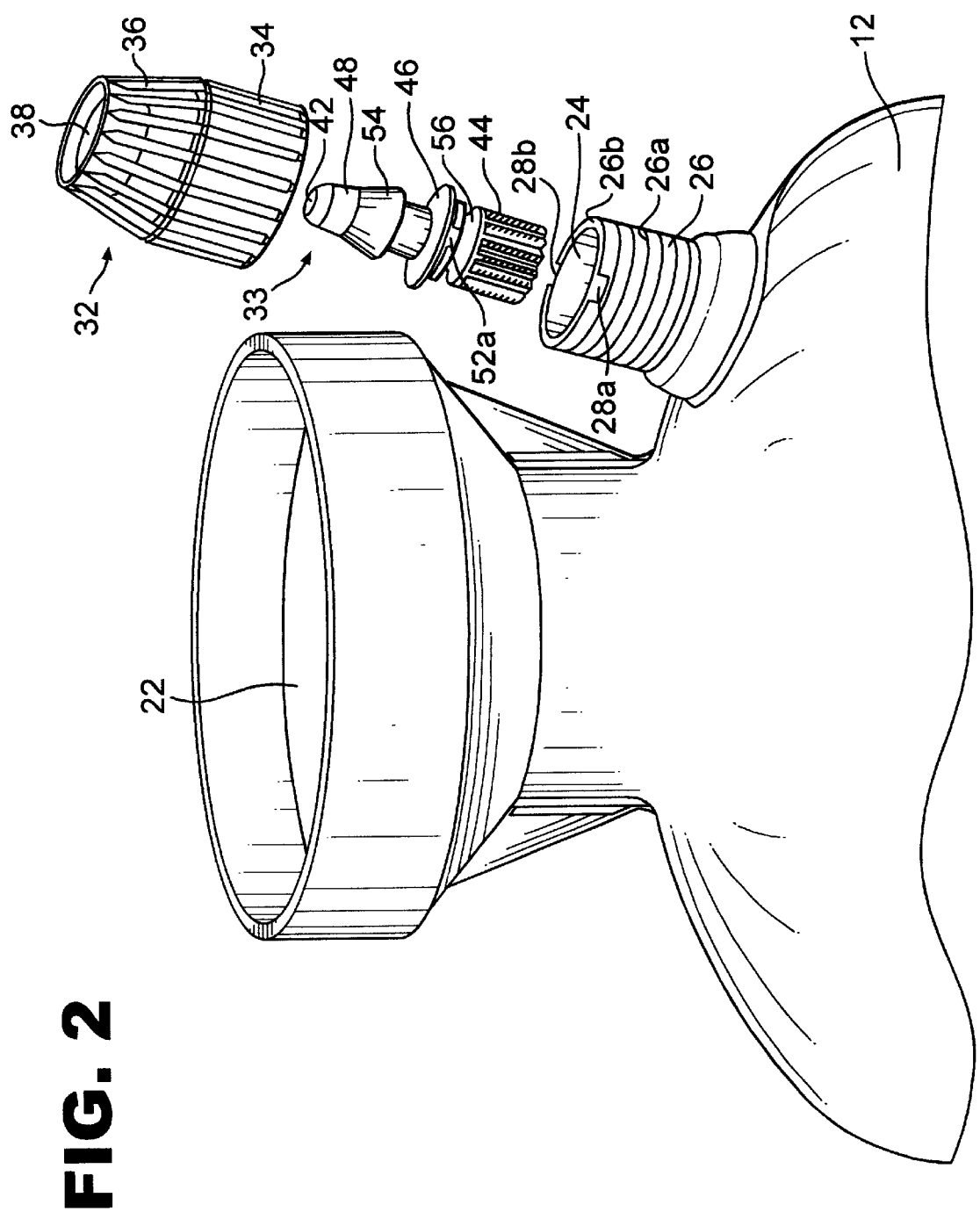
FIG. 2 is an exploded perspective, partially fragmented view of the hose coupling apparatus and compressed air sprayer unit of FIG. 1.

Reservoir 12 is a substantially cylindrical container which holds a quantity of fluid (not shown) to be applied by spraying from spray unit 10. Reservoir 12 is constructed of, for example, aluminum or other material that is suitable to contain fluid under pressure, and has a capacity of, for example, at least one gallon. Reservoir 12 defines a fill opening 22 and a discharge opening 24 (FIG. 2). Fill opening 22 is typically externally or internally threaded. Fluid is placed into reservoir 12 through fill opening 22.

Discharge opening 24 is substantially cylindrical in shape and of a predetermined diameter. Discharge opening 24 is surrounded by elongate neck 26 having a predetermined diameter and height. Neck 26 includes an outside surface (not referenced) thereof having threads 26a. Two diametrically-opposed slots 28a, 28b are formed on the outside surface of neck 26, adjacent rim 26b. More particularly, slots 28a, 28b are formed on diametrically opposed points on neck 26. Slots 28a, 28b extend from rim 26b a predetermined distance down neck 26 in a direction towards reservoir 12. Slots 28a, 28b extend only partially through the thickness (not shown) of neck 26.

Pump 14 is sealingly coupled, such as, for example, by corresponding threads (not shown) formed thereon, to fill opening 22. Pump 14 is operable to increase pressure within reservoir 12, to thereby facilitate the spraying of fluid from within reservoir 12 through discharge opening 24 and into the ambient environment.

Hose 16 is an elongate tubular member which is placed into fluid communication with discharge opening 24 of reservoir 12 in a manner which will be described more particularly hereinafter. One end of hose 16 is coupled to coupling apparatus 20. The other end of hose 16 is terminated by spray wand 30 or other suitable shut-off valve. Once reservoir 12 is filled with fluid and pressurized, a user actuates the shut-off valve to spray fluid from spray unit 10. Hose 16 is constructed of, for example, rubber.

Figure 3:
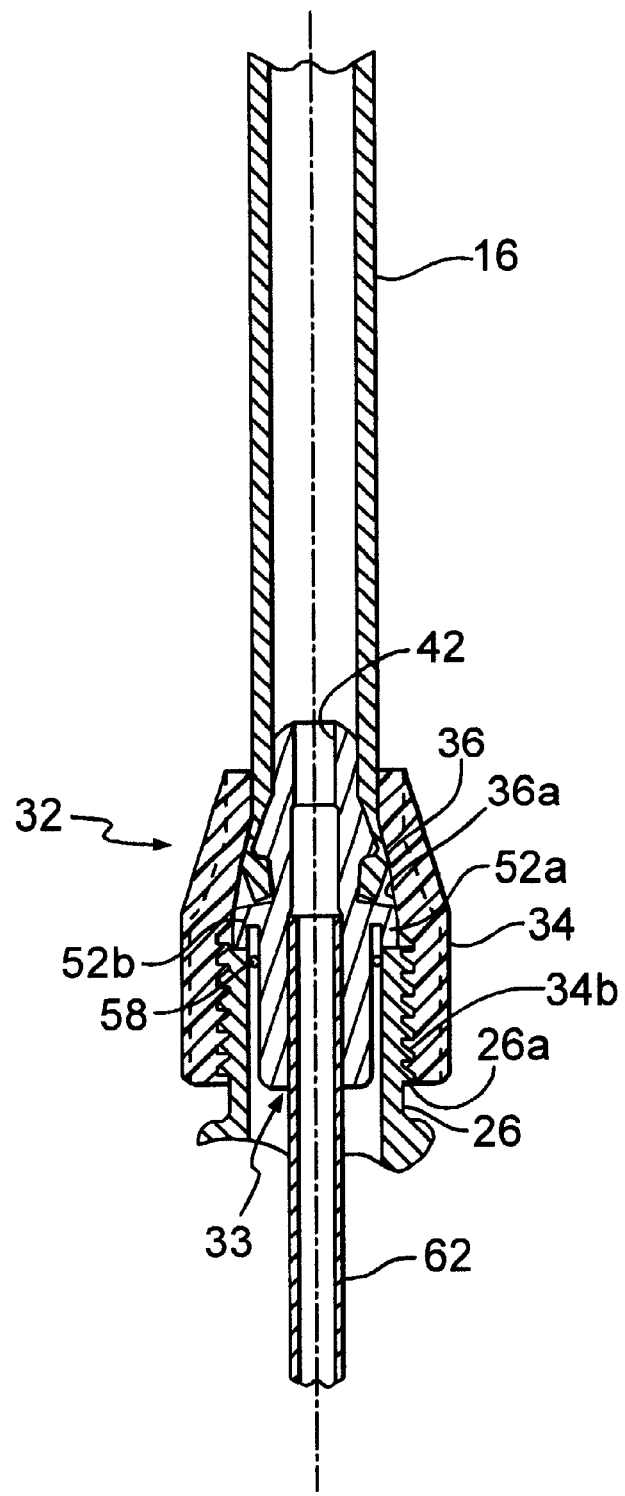
FIG. 3 is a cross-sectional partially fragmented view of the hose coupling apparatus and compressed air sprayer unit of FIG. 1.

Referring now to FIGS. 2 and 3, hose coupling apparatus 20 includes hose nut 32 and hose retainer 33. Hose nut 32 is a substantially cylindrical hollow member, and includes threaded portion 34, tapered portion 36 and hose bore 38. Threaded portion 34 defines threads 34b (FIG. 3) on an inside surface (not referenced) thereof Threads 34b are complementary to threads 26a of neck 26. Tapered portion 36 has inside surface 36a which tapers from a greater diameter proximate to threaded portion 34 to a lesser diameter more distant from, or less proximate to, threaded position 34. Hose bore 38 extends longitudinally through hose nut 32. Hose 16 is slidingly received within and extends through hose bore 38. Hose nut 32 is constructed of, for example, steel, plastic or other suitable material.

Hose retainer 33 is an elongate hollow body, and defines a fluid passageway 42 therethrough. Hose retainer 33 includes plug end 44, cap portion 46 and stem end 48. Plug end 44 is substantially cylindrical and has a diameter (not referenced) that is a predetermined amount less than the diameter of discharge opening 24. Cap portion 46 is substantially cylindrical and has a predetermined diameter (also not referenced) that enables cap portion 46 to seat upon rim 26b of neck 26 without interfering with the engagement of hose nut 32 with neck 26. Locking tabs 52a, 52b are disposed at diametrically-opposed points on the periphery of cap portion 46. Locking tabs 52a, 52b extend axially a predetermined distance from cap portion 46 in a direction towards plug end 44, and extend radially outward a predetermined distance from cap portion 46. Stem end 48 defines barb 54 thereon, having a diameter which increases with proximity to cap portion 46. Recess 56 is defined by plug end 44 proximate cap portion 46. Recess 56 has a predetermined height and is disposed around the circumference of plug end. O-ring 58 (FIG. 3) is disposed in recess 56. O-ring 58 is constructed of a resiliently-deformable material, such as, for example, rubber or other suitable material.

In use, hose retainer 33 fluidly couples hose 16 to discharge opening 24 and, thus, to the fluid contained within reservoir 12. More particularly, plug end 44 is aligned with and inserted into discharge opening 24 until cap portion 46 seats upon, or abuttingly engages, rim 26b of neck 26. One end of fluid pickup tube 62 (FIG. 3) of sprayer unit 10 is received within the portion of fluid passageway 42 formed within plug end 44. The other end of fluid pickup tube 62 is disposed proximate the bottom (not referenced) of reservoir 12. Hose retainer 33 is rotated to dispose locking tabs 52a, 52b within slots 28a, 28b, respectively, of neck 26. Thus, locking tabs 52a, 52b are snugly received within slots 28a, 28b, respectively, and cap portion 46 is seated upon rim 26b. With locking tabs 52a, 52b disposed within slots 28a, 28b, respectively, hose retainer 33 is precluded from rotating relative to neck 26. As described above, O-ring 58 is seated within recess 56, which is disposed intermediate plug end 44 and cap portion 46. Thus, O-ring 58 is disposed within discharge opening 24 and engages in an air and fluid tight manner the inside surface (not referenced) of neck 26.

Hose nut 32 physically couples hose retainer 33 to neck 26. Hose nut 32 is slidingly disposed on hose 16, with hose 16 extending through hose bore 38. One end of hose 16 receives stem end 48 of hose retainer 33. More particularly, hose 16 is pushed down onto and over barb 54 of stem end 48. Thereafter, hose nut 32 is slid down hose 16 and threaded onto threads 26a of neck 26. As hose nut 32 is threaded onto neck 26 and tightened, inside surface 36a of tapered portion 36 abuttingly engages the periphery of cap portion 46 of hose retainer 33 and thereby precludes substantially all axial movement of hose retainer 33. Locking tabs 52a, 52b are thus retained in disposition within slots 28a, 28b, and any rotation of hose retainer 33 relative to neck 26 is precluded. Therefore, hose retainer 33 is prevented from rotating as a result of any torsional forces imparted thereon by the turning and/or twisting of spray wand 30 due to the disposition of locking tabs 52a, 52b within slots 28a, 28b.

In the embodiment shown, each of slots 28a, 28b are formed in the outside surface of neck 26 and do not extend through the entire thickness of neck 26. However, it is to be understood that slots 28a and 28b can be alternately configured, such as, for example, notches which extend through the entire thickness of neck 26, with locking tabs 52*a* and 52*b* being correspondingly configured.

In the embodiment shown, slots 28*a* and 28*b* are formed on diametrically opposed points of the outside surface of neck 26. However, it is to be understood that slots 28*a* and 28*b* can be alternately configured to be disposed, for example, at non-diametrically opposed points on neck 26, with locking tabs 52*a*, 52*b* being correspondingly configured.

In the embodiment shown, two slots 28*a*, 28*b* are formed on neck 26. However, it is to be understood that spray unit 10 may be configured with a greater or fewer number of slots which receive a corresponding number of locking tabs.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed is:

1. A spray unit, comprising:
   a reservoir, said reservoir defining a fill opening and a discharge opening, said discharge opening surrounded by a neck having a rim, at least one slot defined by said neck, said at least one slot extending from said rim a predetermined distance along said neck in a direction toward said reservoir;
   an elongate hollow hose having a reservoir end and a spray end, said spray end being terminated by a shut-off valve; and
   a hose coupling apparatus coupling said hose to said discharge opening, said hose coupling apparatus comprising:
      an elongate hose retainer having a plug end and a stem end, said hose retainer defining a longitudinal fluid passageway extending therethrough from said plug end to said stem end, said plug end being at least partially received within said discharge opening, said stem end being received at least partially within said hose, at least one locking tab disposed on and extending from said hose retainer in at least one of a radial and an axial direction relative to said discharge opening, each of said at least one locking tab being disposed within a corresponding one of said at least one slot to thereby preclude rotation of said hose retainer relative to said discharge opening; and
      a hose nut defining a hose bore therethrough, said hose bore configured for receiving said hose such that said hose nut is slidable over said hose, said hose nut coupling said hose retainer to said neck to thereby retain each of said at least one locking tab in disposition within each of said at least one slot.

2. The hose coupling apparatus of claim 1, wherein said stem end defines a barb, said barb configured for securely coupling said hose to said stem end.

3. The hose coupling apparatus of claim 1, wherein said plug end is substantially cylindrical and defines a recess having a predetermined height, said recess extending around a circumference of said plug end.

4. The hose coupling apparatus of claim 3, further comprising a resiliently-deformable O-ring disposed within said recess, said O-ring configured sealingly engaging an inside surface of said neck.

5. The spray unit of claim 1, wherein said hose coupling apparatus further comprises a substantially cylindrical cap portion disposed intermediate said plug end and said stem end, each of said at least one locking tab being disposed on a periphery of said cap portion and extending therefrom in at least one of an axial and a radial direction.

6. The hose coupling apparatus of claim 5, wherein said at least one locking tab is integral and monolithic with said cap portion.

7. The hose coupling apparatus of claim 5, wherein said cap portion is configured to seat upon said rim of said neck.

8. The hose coupling apparatus of claim 7, wherein said hose nut includes a threaded portion, said threaded portion including internal threads on an inside surface thereof, said neck including corresponding threads, said internal threads of said hose nut engaging said threads on said neck, said hose nut thereby threadingly engaging said neck.

9. The hose coupling apparatus of claim 8, wherein said hose nut includes a tapered portion, said tapered portion increasing in diameter with proximity to said threaded portion such that said tapered portion abuttingly engages said hose retainer when a predetermined number of said threads of said hose nut engage said threads on said neck.

10. A hose coupling apparatus for removably coupling a hose to a discharge opening of a spray unit, said discharge opening surrounded by an elongate neck, said hose coupling apparatus comprising:
    an elongate hose retainer having a plug end and a stem end, said hose retainer defining a longitudinal fluid passageway extending therethrough from said plug end to said stem end, said plug end configured for being received within said discharge opening, said stem end configured for being coupled to said hose, at least one locking tab disposed intermediate said plug end and said stem end, each of said at least one locking tab configured for being disposed within a corresponding at least one slot defined by said neck to thereby preclude rotation of said hose retainer relative to said discharge opening; and
    a hose nut defining a hose bore therethrough, said hose bore configured for receiving said hose such that said hose nut is slidable over said hose, said hose nut configured for coupling said hose retainer to said neck and for retaining each of said at least one locking tab in disposition within each of said at least one slot.

11. The hose coupling apparatus of claim 10, wherein said stem end defines a barb, said barb configured for securely coupling said hose to said stem end.

12. The hose coupling apparatus of claim 10, wherein said plug end is substantially cylindrical and defines a recess having a predetermined height, said recess extending around a circumference of said plug end.

13. The hose coupling apparatus of claim 12, further comprising a resiliently-deformable O-ring disposed within said recess, said O-ring configured for sealingly engaging an inside surface of said neck.

14. The hose coupling apparatus of claim 10, further comprising a substantially cylindrical cap portion, said cap portion disposed intermediate said plug end and said stem end, each of said at least one locking tab disposed on a periphery of said cap portion and extending therefrom in at least one of an axial and a radial direction.

15. The hose coupling apparatus of claim 14, wherein said at least one locking tab is integral and monolithic with said cap portion.

16. The hose coupling apparatus of claim 14, wherein said cap portion is configured to seat upon a rim of said neck.

17. The hose coupling apparatus of claim 16, wherein said hose nut includes a threaded portion, said threaded portion including internal threads on an inside surface thereof, said internal threads of said hose nut configured for engaging corresponding threads on said neck, said hose nut thereby configured for threadingly engaging said neck.

18. The hose coupling apparatus of claim 17, wherein said hose nut includes a tapered portion, said tapered portion increasing in diameter with proximity to said threaded portion, said tapered portion being configured for abuttingly engaging said hose retainer when a predetermined number of said internal threads of said hose nut engage said threads on said neck.

19. A hose retainer for use with a spray unit having a reservoir, said reservoir defining a discharge opening surrounded by a neck, said hose retainer comprising:

a plug end configured for being received at least partially within the discharge opening of the reservoir;

a stem end configured for being received at least partially within a hose of the spray unit;

a longitudinal fluid passageway defined by and extending through said hose retainer from said plug end to said stem end; and at least one locking tab disposed on and extending from said hose retainer in at least one of a radial and an axial direction relative to the discharge opening of the spray unit, said at least one locking tab configured for being received within a corresponding slot defined by the neck of the reservoir to thereby preclude rotation of said hose retainer relative to the neck.

20. The hose retainer of claim 19, wherein said stem end defines a barb, said barb configured for securely coupling a hose to said stem end.

21. The hose retainer of claim 19, wherein said plug end is substantially cylindrical and defines a recess having a predetermined height, said recess extending around a circumference of said plug end.

22. The hose retainer of claim 21, further comprising a resiliently-deformable O-ring disposed within said recess.

23. The hose retainer of claim 19, further comprising a cap portion disposed between said plug end and said stem end, said cap portion being substantially cylindrical, each of said at least one locking tab being disposed on said cap portion and extending therefrom in at least one of an axial and a radial direction.

24. The hose retainer of claim 23, wherein said at least one locking tab is integral and monolithic with said cap portion.

25. The hose retainer of claim 23, wherein said cap portion is configured to seat upon a rim of the neck.

\* \* \* \* \*